Figure 1:
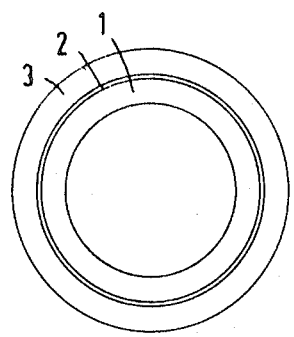

United States Patent

[11] 3,620,691

| | | |
|---|---|---|
| [72] | Inventor | Hartmut Rubel<br>Erlangen, Germany |
| [21] | Appl. No | 442,960 |
| [22] | Filed | Mar. 26, 1965 |
| [45] | Patented | Nov. 16, 1971 |
| [73] | Assignee | Siemens-Aktiengesellschaft |
| [32] | Priorities | Apr. 11, 1964 |
| [33] | | Germany |
| [31] | | S 90499;<br>Nov. 14, 1964, Germany, No. S 94187 |

[54] ZIRCONIUM STRUCTURE
5 Claims, 3 Drawing Figs.

[52] U.S. Cl.................................................. 29/191,
29/191.6, 29/196, 29/197, 176/38, 176/88,
161/225, 75/177
[51] Int. Cl...................................................... B32b 15/00
[50] Field of Search........................................... 29/195,
194, 196, 197, 191, 191.2, 191.6, 183.5, 183;
176/38, 82, 88; 161/225; 148/31.5, 34; 75/177

[56] References Cited
UNITED STATES PATENTS

| | | | |
|---|---|---|---|
| 2,947,676 | 8/1960 | Zambrow..................... | 29/194 |
| 3,025,592 | 3/1962 | Fischer et al. ................ | 29/194 |
| 3,050,843 | 8/1962 | Margolis et al. .............. | 29/195 |
| 3,148,038 | 9/1964 | Wolfe........................... | 29/194 |

Primary Examiner—Richard O. Dean
Attorney—Curt M. Avery

ABSTRACT: Structure having an inner core comprising a high-strength zirconium alloy, a layer of a gas diffusion-impeding material on the surface of the core and a highly corrosion-resistant zirconium alloy layer engirdling the core and in intimate contact with the gas diffusion-impeding layer.

ZIRCONIUM STRUCTURE

My invention relates to zirconium structures. More particularly, it relates to zirconium structures such as sheets, tubes and profile rods particularly suitable for use in nuclear reactors.

Among the requirements that have to be satisfied by materials utilized in nuclear reactors, three of the most important and which must be satisfied are small neutron absorption cross section, high-corrosion resistance to the coolant, particularly at elevated temperatures, and great mechanical strength.

Pure zirconium metal uniquely fulfills the requirement of small neutron absorption cross section to a particularly advantageous degree. However, the pure zirconium metal does not satisfactorily meet the other requirements listed above, viz, high-corrosion resistance toward the coolant, especially at elevated temperatures and great mechanical strength. Heretofore, to overcome the deficiencies of zirconium with respect to heat resistance properties, zirconium alloys such as zirconium-tin-aluminum alloys have been made which have superior properties in this regard. These alloys are, however, not satisfactorily corrosion resistant.

Similarly, zirconium alloys such as zirconium-copper alloys exist which are quite corrosion resistant to reactor coolants, i.e., steam and/or carbon dioxide, but which, because of their low-strength properties, particularly low-creep strength, as measured against time, are unsuitable as nuclear reactor construction materials. Because of these respective deficiencies in different zirconium alloys, heretofore, it has been necessary to effect a compromise in the use of these alloys in nuclear reactor design. Of course, effectively such compromise has signified that it has been impossible to avail fully of the separately technically obtainable maximum performance values of the different zirconium alloys. In addition, zirconium alloys utilized in nuclear reactors have tended to become brittle as a consequence of the diffusion thereinto of hydrogen and consequently become progressively degraded in strength as their length of use increases whereby they are effectively employable for an unsatisfactorily restricted time period.

Accordingly, it is an important object of this invention to provide a zirconium material which embodies the properties of small neutron absorption cross section, superior high-corrosion resistance characteristics to a reactor coolant, particularly at elevated temperatures, and high-mechanical strength.

It is a further object to provide a zirconium material in accordance with the preceding object which is advantageously suitable for use in nuclear reactors.

The foregoing objects are attained according to the invention by providing a multilayer structure which comprises at least two metallic layers with a gas impermeable, i.e., a hydrogen-diffusion impeding layer provided between the metallic layers. One of the metallic layers is suitable chosen to be a high-strength zirconium alloy, and the other metallic layer is selected to be a highly corrosion-resistant zirconium alloy. The hydrogen-impermeable intermediate layer is suitably chosen to be zirconium oxide.

The shape of the structure may be planar, of circular or elliptical outline, such as a tube, a rod, or sheet, etc., with the outer periphery layer thereof comprising the corrosion-resistant zirconium alloy which need not have high-strength characteristics. The surface that the structure presents to a corroding medium in a nuclear reactor such as a current of gas or a fluid coolant is its corrosion-resistant zirconium alloy component. The corrosion-resistant zirconium alloy component serves as a coating for a structure core which comprises a high-mechanical strength zirconium alloy which, although it may be normally readily corrodible if subjected to a metal-attacking coolant, is protected thereagainst by the outer corrosion-resistant zirconium alloy.

In nuclear reactors, particularly those cooled by water or steam, a salient factor in determining the operational useful life of the structural materials, in addition to their corrosion resistance and mechanical strength, is the embrittlement caused by the absorption of hydrogen. Since the absorption of hydrogen cannot be completely eliminated even with the use of corrosion-resistant zirconium alloys, there exists the danger that hydrogen will permeate into the interior of the structure through diffusion into the region of the high-strength zirconium alloy to cause hydrogen embrittlement therein. Similarly, in nuclear reactors which are cooled with materials other than water and steam, such as carbon dioxide, for example, the problem of gas absorption by diffusion into the interior of the structure may present itself. Thus, since gas infusion into the reactor structures is a problem substantially universally present, no matter what the type of coolant employed may be, gas diffusion inhibiting layers are advantageously used in structures for all types of nuclear reactors.

According to the invention, to eliminate such gas diffusion and thereby eliminate embrittlement of the high-strength zirconium alloy inner core of the structure, there is provided a zirconium oxide intermediate layer between the outer corrosion-resistant zirconium alloy and the inner core high-strength zirconium alloy. This zirconium oxide intermediate layer presents an effective barrier to penetrating diffusion into the structure of undesirable materials, particularly gases, such as hydrogen diffusion into the high-strength zirconium alloy.

In understanding the functioning of a multilayered structure as a nuclear reactor member, the outer layer corrosion resistant zirconium alloy is the part which comes into contact with the water and/or steam and is subject to corrosive stresses of water and/or steam pressure. The outer layer may be corroded thereby and consequently absorbs a given amount of hydrogen. Since hydrogen is at first present in dissolved form in the coolant, it is distributed uniformly. In accordance with the vapor pressure of the dissolved hydrogen components, there is built up in the inherent gap between the outer and inner zirconium alloy layers, an $M_2$-partial pressure due to hydrogen ingress thereinto and its recombination into molecular hydrogen. This partial pressure progressively increases until its concentration exceeds its characteristic solubility value at which point zirconium hydride is formed in the system. The partial pressure in the gap in the presence of hydrides may reach a maximum magnitude of about $10^{7.5+1}$ Torr. In the absence of an intermediate zirconium oxide layer in the structure, such hydrogen partial pressure magnitude is sufficient to permit a hydrogen absorption ingress beginning at a temperature of about 400° C., the hydrogen thereby penetrating into the high-strength zirconium alloy through absorption, dissociation, passage into the crystal lattice of the alloy and diffusion. Although the hydrogen concentration in the permeated high-strength alloy becomes stabilized after a given period there results an inner high-strength zirconium alloy as permeated with hydrogen as the outer corrosion-resistant zirconium alloy which is directly in contact with the corroding coolant.

The hydrogen permeation process is effectively arrested by the interposed zirconium oxide layer which operates to retard the speed of the one or the several partial processes through which hydrogen is absorbed. Consequently, the gas, i.e., hydrogen embrittlement is essentially confined to the corrosion-resistant zirconium alloy component or the structure whose function is not to provide support but protection against corrosion.

Through the use of multilayer zirconium structures, constructed in accordance with the invention in nuclear reactors, their operational life may be substantially prolonged and the temperatures at which they can function satisfactorily may be increased.

The forming of the diffusion inhibiting intermediate layer may be provided in accordance with known procedures such as in autoclaves wherein the surface of the high-strength zirconium alloy component on which the oxide coating is to be provided is subjected at first to oxidation by water or steam pressure, preferably at a temperature of between 300° and 400° C. The oxide layer forming process is completed when the oxide coating layer attains a thickness of between about 1 and 10$\mu$. Alternatively, the oxide layer may be formed through oxidation or electrolytically. The diffusion impeding layer need not necessarily be zirconium oxide and other nonmetallic or metallic materials may be utilized to provide the diffusion impeding layers, examples of such materials being aluminum and iron oxide. It is to be realized that the intermediate layer consists of a material which in addition to impeding gas diffusion by being quite impermeable thereto is preferably one which is advantageously radiation resistant and which is characterized by an optimally low neutron absorption. Zirconium oxide, iron and aluminum are very suitable in these respects.

The providing of the corrosion-protective layer of a suitable corrosion-resistant zirconium alloy, depending upon the configuration of the completed structure, can be effected by methods such as rolling, clodding or explosion plating. Clodding is especially suitable for tubular or rod-shaped cores and is suitably carried out with the zonal heating of a tube consisting of corrosion-resistant zirconium alloy which has first been forced on in open tubular form over the high-strength zirconium alloy core. In such zonal heating with the concurrent application of an axial stress, because of the low yield point of torsional shear in the heated zone, there takes place in such zone a transverse contraction whereby an intimate contact is formed thereat between the inner high-strength core and the outer corrosion-resistant tube. Upon cooling of the thus formed structure, there ensues a further shrinking of the outer tube onto the inner core whereby there results a uniform very high-bearing pressure throughout the interface between the core and the outer tube. For complex structural configurations, bonding of the outer corrosion-resistant component to the inner high-strength core may suitably be effected by explosion plating.

Generally speaking and in accordance with the invention, there is provided a structure comprising an inner layer comprising a high-strength zirconium alloy, a gas diffusion-impeding layer on the outer surface of the inner layer and a highly corrosion-resistant zirconium layer on and completely engirdling the gas diffusion-impeding layer.

In accordance with an illustrative embodiment of the invention, there is provided a structure comprising an inner layer comprising a zirconium alloy having the composition Zr—Al 1.25 Sn 1 Mo 1 a zirconium oxide layer of 1 to 10μin thickness on the outer surface of the inner layer and an outer layer in intimate contact with and completely engirdling the zirconium oxide layer, the outer layer comprising a corrosion-resistant zirconium alloy which may be, for example, a ternary alloy on a Zr—Nb base such as one having the composition ZrNb 2.5 Cu 0.5 or a ZrCu alloy such as one having the composition ZrCu Mo 0.5.

The foregoing and more specific objects and features of my invention will be apparent from, and will be mentioned in the following description of the zirconium structure according to the invention shown by way of example in the accompanying drawing in which FIG. 1 shows both in end elevation and FIG. 2 in side cross section an illustrative embodiment of tubular configuration constructed in accordance with the principles of the invention. FIG. 3 is a cross section of an embodiment having a U-shaped configuration.

Figure 2:
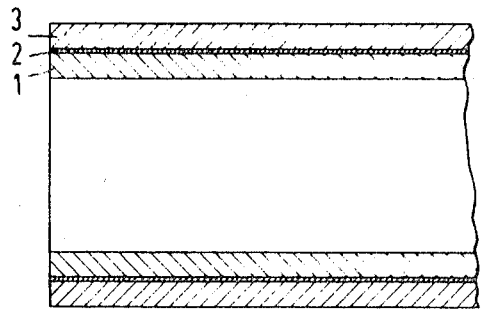
Figure 3:
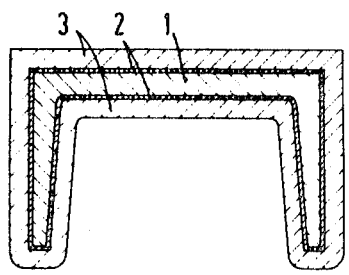

Referring now to FIGS. 1 and 2 wherein there is shown an illustrative embodiment constructed in accordance with the principles of the invention and of tubular construction, an inner layer comprising an inner tube 1 comprises a high-strength zirconium alloy, suitably an alloy such as one having the composition ZrAl 1.25 Sn 1 Mo 1. On the outer circumferential surface of tube 1 is a substantially uniform zirconium oxide layer 2 having a thickness of about 1 to 10μoxide layer 2 being formed on tube 1, as described hereinabove, by an autoclave treatment or by other known techniques. The outer layer comprising an outer tube 3 which is tightly fitted over the zirconium oxide layered inner tube 1 comprises a zirconium alloy with optimum corrosion resistance properties, a suitable alloy being, for example, a ternary alloy on a ZrNb base and having a composition ZrNb 2.5 Cu 0.5 or a ZrCu alloy such as ZrCu 0.5 Mo 0.5. Tube 3 is shrunk onto inner tube 1 by known methods as described hereinabove such as the concurrent application of zonal heating and axial tension with subsequent shrinkage after cooling.

In the event that the bore of a tubular structure such as shown in FIGS. 1 and 2 is to be traversed by the corroding fluid, i.e., gas, steam or water coolant, it is advisable to provide a second zirconium oxide layer on the inner surface of layer, i.e., tube 1 and to provide a second layer of corrosion-resistant zirconium alloy as the inner layer of the tube in intimate contact with the second zirconium oxide layer, such second layers being suitably provided in accordance with the techniques for providing such layers as described hereinabove in connection with tube 1 and oxide layer 2. It is readily appreciated that in the forming of a tubular structure with a second corrosion-resistant zirconium alloy later and a second zirconium oxide layer respectively forming the first two layers encountered from the bore of the tube, the most facile technique of construction is to start with an inner tube of corrosion-resistant zirconium alloy and thereafter successively heating shrinking the respective adjacently occurring tubes whereby a tubular structure having strongly bonded layers results.

In FIG. 3 wherein there is shown in cross section an embodiment of the invention having a U-shape such as a U-profile girder, the intermediate alloy layer 1 comprises a high-strength zirconium alloy. Outer layers 3 which may come into contact with the corrosive coolant fluid comprise a corrosion-resistant zirconium alloy and layers 2 are the zirconium oxide layers. For a complicated structure such as the U-shaped example shown in FIG. 2, an explosion plating process can suitably be used to provide the structure.

It is to be realized that substantially planar structures such as plate-shaped members can be constructed in accordance with the invention. In such members, there would be an inner layer of high-strength zirconium alloy with a zirconium oxide coating thereon firmly bonded to an outer layer comprising a corrosion-resistant zirconium alloy. In forming such plate members, the most suitable construction technique therefor would be to form the outer layer by rolling in order to provide a homogeneous layer.

It is appreciated that in structures which may be subjected to stresses and corrosive fluids but where the problem of diffusion of embrittling gas or other harmful materials is not present, the oxide layer may be omitted in the structure.

It is seen from the foregoing that there is provided, in accordance with the invention, a structure which is capable of a much longer operational life and operation at higher temperatures as compared with known structures used for a similar purpose.

It will be obvious to those skilled in the art upon studying this disclosure that zirconium structures according to my invention permit of a great variety of modifications and hence can be given embodiments other than those particularly described and illustrated herein without departing from the essential features of my invention and within the scope of the claims annexed hereto.

I claim:

1. A nuclear reactor component structure comprising an inner core formed of a zirconium alloy having with respect to zirconium alloys in general the composition Zr—Al. 1.25 Sn 1 Mo 1, an inner layer of material impeding diffusion of gas causing embrittlement of the zirconium alloy disposed on the surface of said core of zirconium alloy, and an outer layer of another zirconium alloy engirdling said core and being in intimate contact with said inner layer, said other zirconium alloy having the composition ZrNb 2.5 Cu 0.5.

2. A nuclear reactor component structure according to claim 1 wherein the material of said inner layer impedes the diffusion of hydrogen, is resistant to radiation and has a low neutron absorption cross section.

3. A nuclear reactor component structure according to claim 1 wherein the material of said inner layer is selected from the group consisting of iron, aluminum and zirconium oxide.

4. A nuclear reactor component structure comprising an inner core formed of a zirconium alloy having the composition Zr—al. 1.25 Sn 1 Mo 1, an inner layer of zirconium oxide for impeding diffusion of gas causing embrittlement of the zirconium alloy disposed on the surface of said core of zirconium alloy, and an outer layer of another zirconium alloy engirdling said core and being in intimate contact with said inner layer, said other zirconium alloy having the composition ZrNb 2.5 Cu 0.5.

5. A structure as defined in claim 4 wherein said zirconium oxide layer has a thickness of about 1 to $10\mu$.